(12) United States Patent
Suzuki

(10) Patent No.: US 11,785,326 B2
(45) Date of Patent: Oct. 10, 2023

(54) IMAGING APPARATUS

(71) Applicant: CANON KABUSHIKI KAISHA, Tokyo (JP)

(72) Inventor: Akito Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/705,120

(22) Filed: Mar. 25, 2022

(65) Prior Publication Data

US 2022/0217258 A1  Jul. 7, 2022

Related U.S. Application Data

(63) Continuation of application No. 16/166,623, filed on Oct. 22, 2018, now abandoned.

(30) Foreign Application Priority Data

Oct. 25, 2017 (JP) .................................. 2017-206019
Aug. 7, 2018 (JP) .................................. 2018-148511

(51) Int. Cl.
*H04N 23/57* (2023.01)
*G03B 17/12* (2021.01)
(Continued)

(52) U.S. Cl.
CPC ............ *H04N 23/57* (2023.01); *G02B 7/023* (2013.01); *G03B 17/12* (2013.01); *H04N 23/51* (2023.01);
(Continued)

(58) Field of Classification Search
CPC ...... G02B 7/023; G03B 17/12; G03B 17/561; H04N 5/2252; H04N 5/2253;
(Continued)

(56) References Cited

U.S. PATENT DOCUMENTS

2011/0303833 A1\* 12/2011 Fujinaka .............. H04N 5/2257
250/239
2015/0181086 A1\* 6/2015 Pahlitzsch .............. H04N 23/52
348/374
(Continued)

FOREIGN PATENT DOCUMENTS

JP          2002-325199 A      11/2002
JP          2007-47596 A       2/2007
(Continued)

*Primary Examiner* — Antoinette T Spinks
(74) *Attorney, Agent, or Firm* — Canon U.S.A., Inc. IP Division

(57) ABSTRACT

An imaging apparatus includes an image capturing element configured to convert an image obtained through an imaging lens, into an electronic signal, an image capturing element holder configured to hold the image capturing element, a base member configured to tiltably support the image capturing element holder, a driving member configured to tilt the image capturing element holder to incline the image capturing element relative to a surface orthogonal to an optical axis of the imaging lens, and a sealing member configured to seal a gap between the base member and the image capturing element holder, wherein the sealing member deforms by the tilting of the image capturing element holder.

6 Claims, 14 Drawing Sheets

(51) Int. Cl.
 G02B 7/02 (2021.01)
 H04N 23/51 (2023.01)
 H04N 23/54 (2023.01)
 H04N 23/55 (2023.01)
 H04N 23/58 (2023.01)
 G03B 17/56 (2021.01)

(52) U.S. Cl.
 CPC ............ H04N 23/54 (2023.01); H04N 23/55 (2023.01); H04N 23/58 (2023.01); G03B 17/561 (2013.01)

(58) Field of Classification Search
 CPC .. H04N 5/2254; H04N 5/2257; H04N 5/2259; H04N 23/51; H04N 23/54; H04N 23/55; H04N 23/57; H04N 23/58
 See application file for complete search history.

(56) References Cited

U.S. PATENT DOCUMENTS

2015/0274090 A1* 10/2015 Buschmann ........... H04N 23/51
 224/567
2016/0341353 A1* 11/2016 Woodcock ........... F16M 11/126

FOREIGN PATENT DOCUMENTS

| JP | 2013-192207 A | 9/2013 |
| JP | 2015-201685 A | 11/2015 |

* cited by examiner

IMAGING APPARATUS

CROSS-REFERENCE TO RELATED APPLICATION

This application is a Continuation of U.S. application Ser. No. 16/166,623, filed Oct. 22, 2018, which claims the benefit of Japanese Patent Applications No. 2017-206019, filed Oct. 25, 2017, and No. 2018-148511, filed Aug. 7, 2018, which are hereby incorporated by reference herein in their entireties.

BACKGROUND OF THE INVENTION

Field of the Invention

The present invention relates to an imaging apparatus.

Description of the Related Art

In a network camera represented by, for example, a monitoring camera, a camera unit images incident light passed through a lens unit by an image capturing element, to acquire an image.

When an object in depth of field is imaged, an image in an excellent imaging state is typically acquired, and when an object outside the depth of field is imaged, an image deteriorated in the imaging state is typically acquired.

In particular, when a network camera is used with a diaphragm in an open state, an imaging range within a range of an imaging screen easily falls outside the depth of field. Accordingly, in terms of monitoring use, when an object such as a human face is within a range where an imaging state is poor, the object may not be recognized. In such a case, the depth of field can be made deeper by narrowing down the diaphragm. In the monitoring during the hours of darkness, however, there is a case where a network camera is used with the diaphragm in the open state in order to take in a large quantity of light. In such a case, it is not possible to narrow down the diaphragm. Although a plurality of monitoring cameras may be installed according to each distance to the object, to capture the object within the depth of field, this increases the number of cameras. Accordingly, a camera by itself achieving deep depth of field is demanded.

In response to the demand, there is a camera technology including a tilt function that tilts an image capturing element relative to a lens unit, to widen the range of the depth of field, as a technology to make the depth of field deep while the diaphragm is open.

When the image capturing element is tilted relative to the lens unit, however, a gap occurs around a tilting unit.

The gap is desirably sealed in order to prevent foreign matters entering the camera unit from the gap, from being appeared in a captured image.

Some of the existing imaging apparatuses without the tilt function include a sealing member that is disposed between the image capturing element and an optical filter in order to prevent foreign matters from entering the camera unit.

For example, Japanese Patent Application Laid-Open No. 2016-139763 discusses a structure in which a seal glass and a frame to which an image capturing element is attached are bonded to each other by a sealing resin.

In the case of an imaging apparatus in which the camera technology including the tilt function for tilting the image capturing element relative to the lens unit is implemented, however, a size of the gap around the tilting unit varies by tilting of the image capturing element relative to the lens unit. Accordingly, if the sealing structure discussed in Japanese Patent Application Laid-Open No. 2016-139763 is applied to the imaging apparatus including the tilt function, the gap may not be sealed when a tilting angle is increased.

SUMMARY OF THE INVENTION

According to an aspect of the present invention, an imaging apparatus includes an image capturing element configured to convert an image obtained through an imaging lens, into an electronic signal, an image capturing element holder configured to hold the image capturing element, a base member configured to tiltably support the image capturing element holder, a driving member configured to tilt the image capturing element holder to incline the image capturing element relative to a surface orthogonal to an optical axis of the imaging lens, and a sealing member configured to seal a gap between the base member and the image capturing element holder, wherein the sealing member deforms by the tilting of the image capturing element holder.

Further features of the present invention will become apparent from the following description of exemplary embodiments with reference to the attached drawings.

DESCRIPTION OF THE EMBODIMENTS

Some exemplary embodiments of the present invention are described below with reference to drawings.

Figure 1:
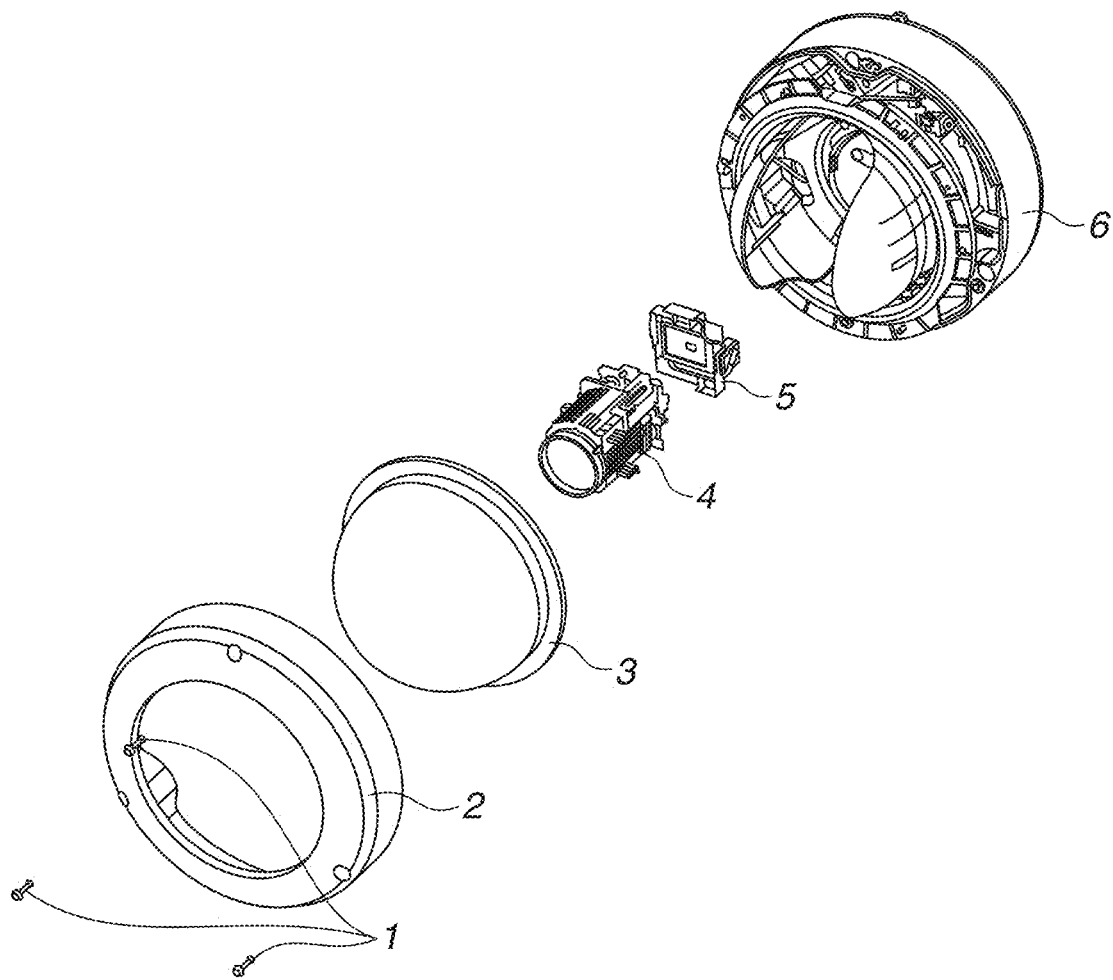
FIG. 1 is an exploded perspective view illustrating a network monitoring camera according to a first exemplary embodiment.
Figure 2:
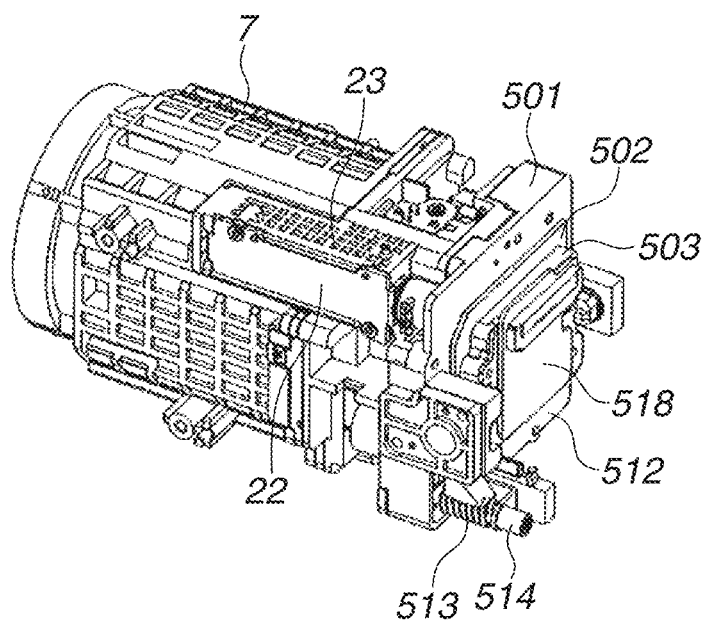
FIG. 2 is a perspective view illustrating an image capturing element unit attached to a lens barrel according to the first exemplary embodiment.
Figure 3:
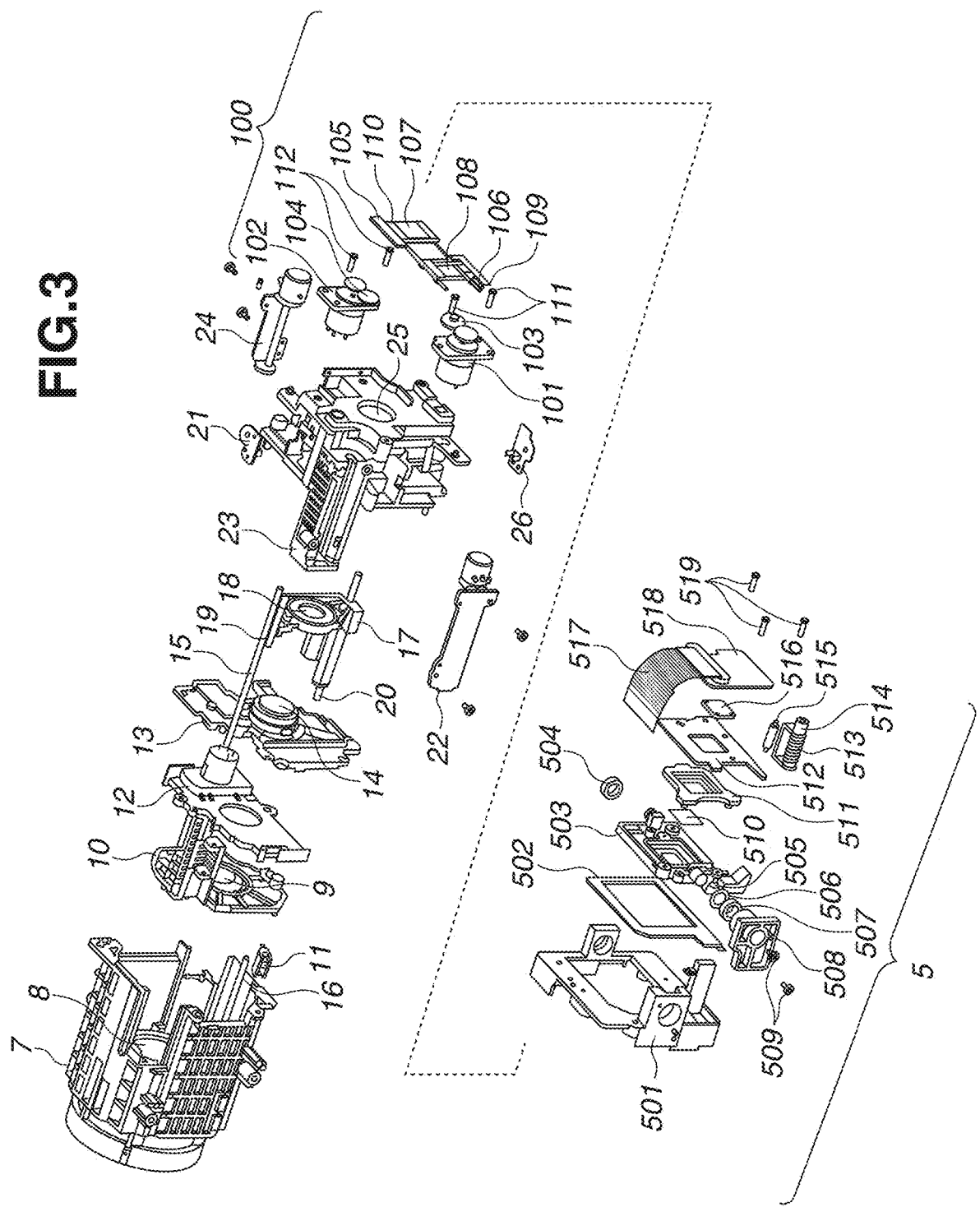
FIG. 3 is an exploded perspective view illustrating the lens barrel and the image capturing element unit according to the first exemplary embodiment.

FIG. 1 is a configuration diagram illustrating a network monitoring camera (hereinafter, referred to as monitoring camera) as an example of an imaging apparatus. FIG. 2 is a perspective view illustrating an image capturing element unit attached to a lens barrel according to a first exemplary embodiment. FIG. 3 is an exploded perspective view illustrating the lens barrel and the image capturing element unit according to the first exemplary embodiment.

The network monitoring camera includes a cover 2, a dome cover 3, a lens barrel 4, an image capturing element unit 5, and a pan-tilt rotation unit 6.

The cover 2 has, at a center, an opening in which the dome cover 3 is disposed, and forms a housing together with the pan-tilt rotation unit 6.

The dome cover 3 has a hemispherical shape and covers the lens barrel 4. The dome cover 3 is held and fixed between the cover 2 and the pan-tilt rotation unit 6.

The pan-tilt rotation unit 6 rotatably supports the lens barrel 4 to which the image capturing element unit 5 is attached, in pan, tilt, and rotation directions. The pan-tilt rotation unit 6 is fastened to the cover 2 by fastening screws 1.

The lens barrel 4 includes lenses of a fixed group and a moving group as imaging lenses, a front fixing frame 7, and guide bars 15, 16, 19, and 20. The lens barrel 4 further includes a lens moving frame 10, a diaphragm unit 12, a lens fixing frame 13, a lens moving frame 17, a rear fixing frame 23, etc.

The lenses of the fixed group and the moving group include a fixed lens 8 fixed in an optical axis direction, a zoom lens 9 that moves in the optical axis direction to perform variable power operation, and a fixed lens 14 fixed in the optical axis direction. The lenses of the fixed group and the lenses of moving group further include a focus lens 18 that moves in the optical axis direction to perform focusing operation, and a fixed lens 25 that is fixed in the optical axis direction. The front fixing frame 7 holds the fixed lens 8. The lens moving frame 10 holds the zoom lens 9. The lens moving frame 10 is held by the guide bar 15 so as to be movable in the optical axis direction. Rotational movement of the lens moving frame 10 around the guide bar 15 is regulated by engagement of the guide bar 16 and a U-shaped groove on the lens moving frame 10.

A rack 11 is fixed to the lens moving frame 10 while being biased in the optical axis direction and a rotation direction by a rack spring (not illustrated), engages with a screw part of a stepping motor 22, and moves together with the lens moving frame 10 in the optical axis direction by rotation of the screw part.

The diaphragm unit 12 adjusts a quantity of light entering the lens barrel 4. The diaphragm unit 12 is fixed to the lens fixing frame 13 by screws (not illustrated).

The lens fixing frame 13 holds the fixed lens 14. The lens moving frame 17 holds the focus lens 18. The lens moving frame 17 is supported by the guide bar 20 so as to be movable in the optical axis direction. Rotation of the lens moving frame 17 around the guide bar 20 is regulated by engagement of the guide bar 19 and a U-shaped groove on the lens moving frame 17. A rack (not illustrated) coupled to the lens moving frame 17 is fixed to the lens moving frame 17 while being biased in the optical axis direction and the rotation direction by a rack spring (not illustrated), engages with a screw part of a stepping motor 24, and moves together with the lens moving frame 17 in the optical axis direction by rotation of the screw part.

The rear fixing frame 23 holds the fixed lens 25. The front fixing frame 7 and the lens fixing frame 13 are fixed to the rear fixing frame 23 by screws (not illustrated). The guide bars 15 and 20 are fixed to be held between the front fixing frame 7 and the rear fixing frame 23. The guide bar 16 is fixed to be held between the front fixing frame 7 and the lens fixing frame 13. The guide bar 19 is fixed to be held between the lens fixing frame 13 and the rear fixing frame 23. Photo interrupters 21 and 26 are fixed to a flexible printed circuit (FPC, not illustrated) by soldering. The FPC is connected to the diaphragm unit 12, stepping motors 22, 24, 101, and 102, and the photo interrupters 21 and 26, and starts up them through energization.

The photo interrupter 21 is disposed in a moving region of the lens moving frame 10, and controls a position of the lens moving frame 10 based on an output of the photo interrupter 21 and the number of driving pulses of the stepping motor 22. The photo interrupter 26 is disposed in a moving region of the lens moving frame 17, and controls a position of the lens moving frame 17 based on an output of the photo interrupter 26 and the number of driving pulses of the stepping motor 24.

Next, an optical filter driving mechanism 100 is described. The optical filter driving mechanism 100 inserts an infrared cut-off filter 107 or a dummy glass 108 into an optical path, or retreats the infrared cut-off filter 107 or the dummy glass 108 from the optical path. The optical filter driving mechanism 100 inserts the infrared cut-off filter 107 into the optical path in a day mode, and retreats the infrared cut-off filter 107 from the optical path and inserts the dummy glass 108 into the optical path in a night mode.

A filter holding frame 109 holds the dummy glass 108, and is supported by guide bars 105 and 106 fixed to the rear fixing frame 23 so as to be movable in a direction substantially perpendicular to the optical axis. A gear unit 103 engaged with the stepping motor 101 fixed to the rear fixing frame 23 by screws 111 engages with a gear part provided on the filter holding frame 109, and the filter holding frame 109 is driven in the direction substantially perpendicular to the optical axis.

A filter holding frame 110 holds the infrared cut-off filter 107, and is supported by the guide bars 105 and 106 so as to be movable in the direction substantially perpendicular to the optical axis. A gear unit 104 engaged with the stepping motor 102 fixed to the rear fixing frame 23 by screws 112 engages with a gear part provided on the filter holding frame 110, and the filter holding frame 110 is driven in the direction substantially perpendicular to the optical axis.

Figure 4A:
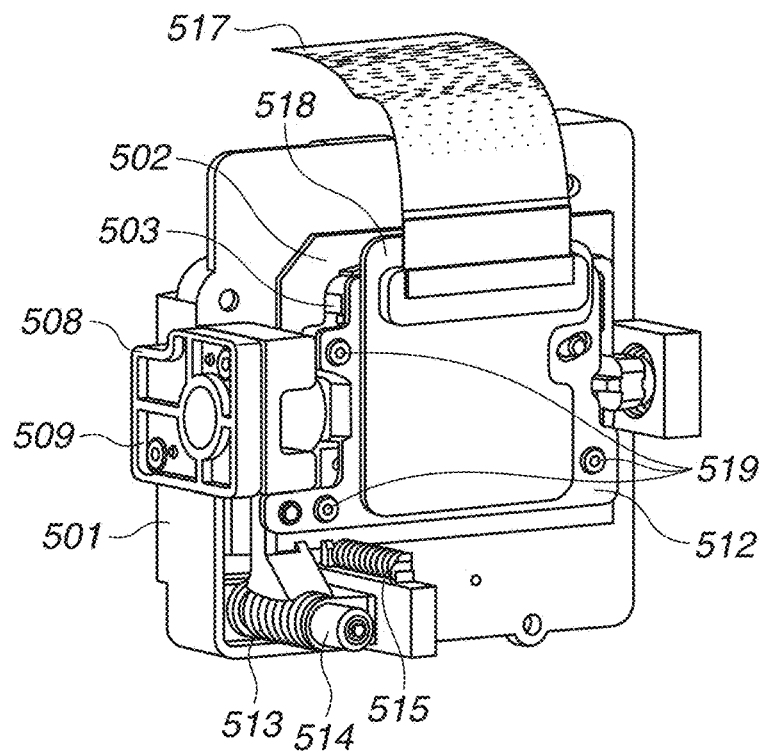
FIG. 4A is a perspective view illustrating the image capturing element unit according to the first exemplary embodiment.
Figure 4B:
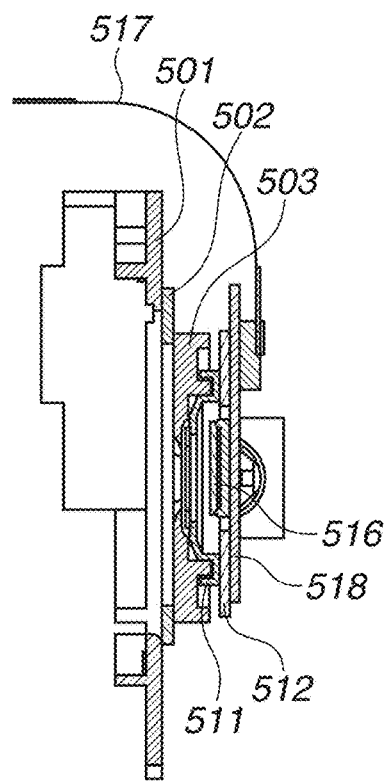
FIG. 4B is a cross-sectional view illustrating the image capturing element unit according to the first exemplary embodiment.
Figure 4C:
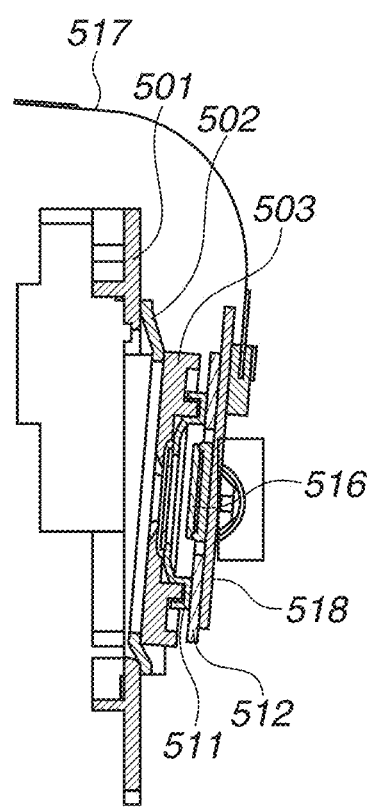
FIG. 4C is a cross-sectional view illustrating the image capturing element unit when an image capturing element is tilted, according to the first exemplary embodiment.

Next, the image capturing element unit 5 is described with reference to FIG. 2 to FIG. 4C. FIG. 4A is a perspective view illustrating the image capturing element unit 5 according to the first exemplary embodiment. FIG. 4B is a cross-sectional view illustrating the image capturing element unit 5 according to the first exemplary embodiment. FIG. 4C is a cross-sectional view illustrating the image capturing element unit 5 when an image capturing element is tilted, according to the first exemplary embodiment.

The image capturing element unit 5 includes a tilt base 501, a sealing member 502, an image capturing element holder 503, and an image capturing element sealing member 511.

The tilt base 501 serving as a base member is fixed to the rear fixing frame 23 by screws (not illustrated). An image capturing element 516 converts an image obtained through the imaging lens into an electronic signal. The image capturing element 516 is soldered to a circuit board 518 that electrically connects the image capturing element 516, and is bonded to an image capturing element sheet metal 512 by an adhesive (not illustrated). The FPC 517 connects the circuit board 518 to the zoom lens 9, the focus lens 18, the diaphragm unit 12, and a driving circuit board (not illustrated) of the optical filter driving mechanism 100.

The image capturing element holder 503 is tiltable to a surface orthogonal to the optical axis. Bearings 504 and 507 are disposed on a tilt shaft of the image capturing element holder 503. Further, a wave washer 505 and a bearing washer 506 are disposed between the image capturing element holder 503 and the bearing 507, and the image capturing element holder 503 is biased in the tilt shaft direction by the wave washer 505 and the bearing washer 506. Further, the image capturing element holder 503 supports the image capturing element sheet metal 512. An optical low-pass filter 510 and the image capturing element sealing member 511 described below are inserted in order into the image capturing element holder 503.

The image capturing element sealing member 511 serving as a second sealing member seals a gap between the image capturing element holder 503 and the image capturing element 516. The image capturing element sealing member 511 is held between the image capturing element sheet metal 512 and the image capturing element holder 503 by fixing the image capturing element sheet metal 512 attached with the image capturing element 516 and the circuit board 518, to the image capturing element holder 503 by fastening screws 519.

The sealing member 502 seals a gap between the image capturing element holder 503 and the tilt base 501. The sealing member 502 is fixed to the tilt base 501 by bonding, and is pressurized toward the tilt base 501 by the image capturing element holder 503. The sealing member 502 is formed of an elastic light-shielding material such as rubber, and deforms by tilting of the image capturing element holder 503.

A stepping motor 514 serving as a driving member is fixed to the tilt base 501, and a worm 513 is fixed to a motor shaft by indentation, etc. A worm wheel is integrally provided on the image capturing element holder 503, and engages with the worm 513. The stepping motor 514 is connected to an FPC (not illustrated), and drives and rotates the worm 513 by energization, to tilt the image capturing element holder 503 and the image capturing element 516. A tension spring 515 is to remove backlash between the worm 513 and the worm wheel, and is attached to the tilt base 501 and the image capturing element holder 503 to generate biasing force in a tension direction.

An initial tilting reference position of the image capturing element holder 503 is determined in such a manner that a voltage output value of a photo interrupter fixed to the tilt base 501 is detected by a detection member integrally provided on the image capturing element holder 503, and the number of driving pulses of the stepping motor 514 is calculated.

Next, relationship between tilting of the image capturing element holder 503 and the sealing member 502 is described. As illustrated in FIG. 4B, when the stepping motor 514 is driven in a state where the image capturing element holder 503 is orthogonal to the optical axis, the image capturing element holder 503 is tilted relative to the surface orthogonal to the optical axis as illustrated in FIG. 4C. In the state illustrated in FIG. 4B, the sealing member 502 seals the gap between the image capturing element holder 503 and the tilt base 501. In addition, also in the state illustrated in FIG. 4C, the sealing member 502 deforms to seal the gap between the image capturing element holder 503 and the tilt base 501.

As described above, the sealing member 502 seals the gap between the image capturing element holder 503 and the tilt base 501 irrespective of a tilting angle of the image capturing element holder 503. This makes it possible to prevent foreign matters from entering the lens barrel 4 and the image capturing element unit 5. Further, since the sealing member 502 is formed of a light-shielding material, it is also possible to prevent unnecessary light from entering the image capturing element 516 from the gap between the image capturing element holder 503 and the tilt base 501.

The stepping motor is used as the driving member in the present exemplary embodiment. Alternatively, an ultrasonic motor may be used.

In the present exemplary embodiment, the sealing member 502 is bonded to the tilt base 501. Alternatively, the sealing member 502 may be bonded to the image capturing element holder 503 and may be pressurized by the tilt base 501 because it is sufficient for the sealing member 502 to be fixed to any one of the tilt base 501 and the image capturing element holder 503.

Figure 5:
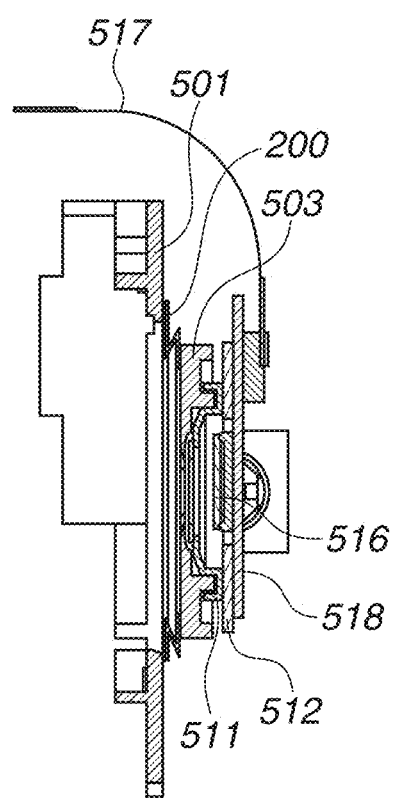
FIG. 5 is a cross-sectional view illustrating an image capturing element unit according to a second exemplary embodiment.

An imaging apparatus according to a second exemplary embodiment is described below with reference to FIG. 5. FIG. 5 is a cross-sectional view of the image capturing element unit 5 according to the second exemplary embodiment. In the present exemplary embodiment, a basic configuration is similar to the basic configuration of the first exemplary embodiment except for a shape of a sealing member 200. The configuration in the second exemplary embodiment is similar to the configuration of the first exemplary embodiment except for the sealing member 200, and description of similar parts is therefore omitted.

The sealing member 200 seals the gap between the image capturing element holder 503 and the tilt base 501. The sealing member 200 is fixed to the tilt base 501 by bonding, and is pressurized toward the tilt base 501 by the image capturing element holder 503. The sealing member 200 is formed of an elastic light-shielding material such as rubber, and has a bellows shape. The sealing member 200 deforms by tilting of the image capturing element holder 503.

In the second exemplary embodiment, since the sealing member 200 has a bellows shape, it becomes possible to reduce driving load associated with the deformation of the sealing member 200 when the image capturing element holder 503 is tilted. Further, the sealing member 200 seals the gap between the image capturing element holder 503 and the tilt base 501 irrespective of the tilting angle of the image capturing element holder 503. This makes it possible to prevent foreign matters from entering the lens barrel 4 and the image capturing element unit 5. Further, since the sealing member 200 is formed of a light-shielding material, it is also possible to prevent unnecessary light from entering the image capturing element 516 from the gap between the image capturing element holder 503 and the tilt base 501.

In the present exemplary embodiment, the sealing member 200 is bonded to the tilt base 501. Alternatively, the sealing member 200 may be bonded to the image capturing element holder 503 and may be pressurized by the tilt base 501 because it is sufficient for the sealing member 200 to be fixed to any one of the tilt base 501 and the image capturing element holder 503.

Figure 6:
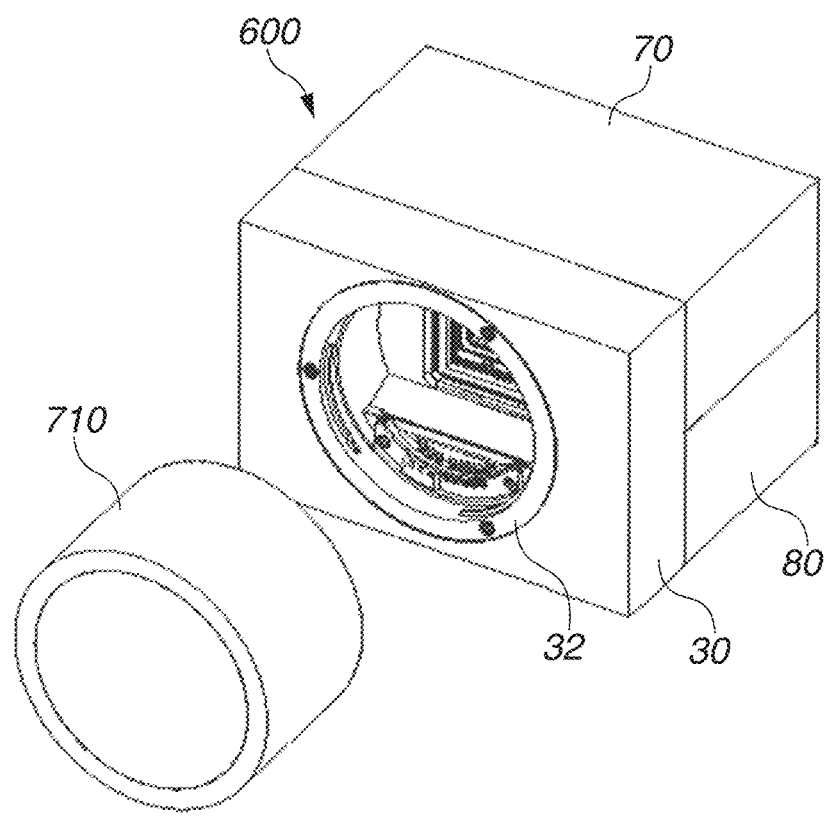
FIG. 6 is an exploded perspective view illustrating a network monitoring camera according to a third exemplary embodiment.
Figure 7:
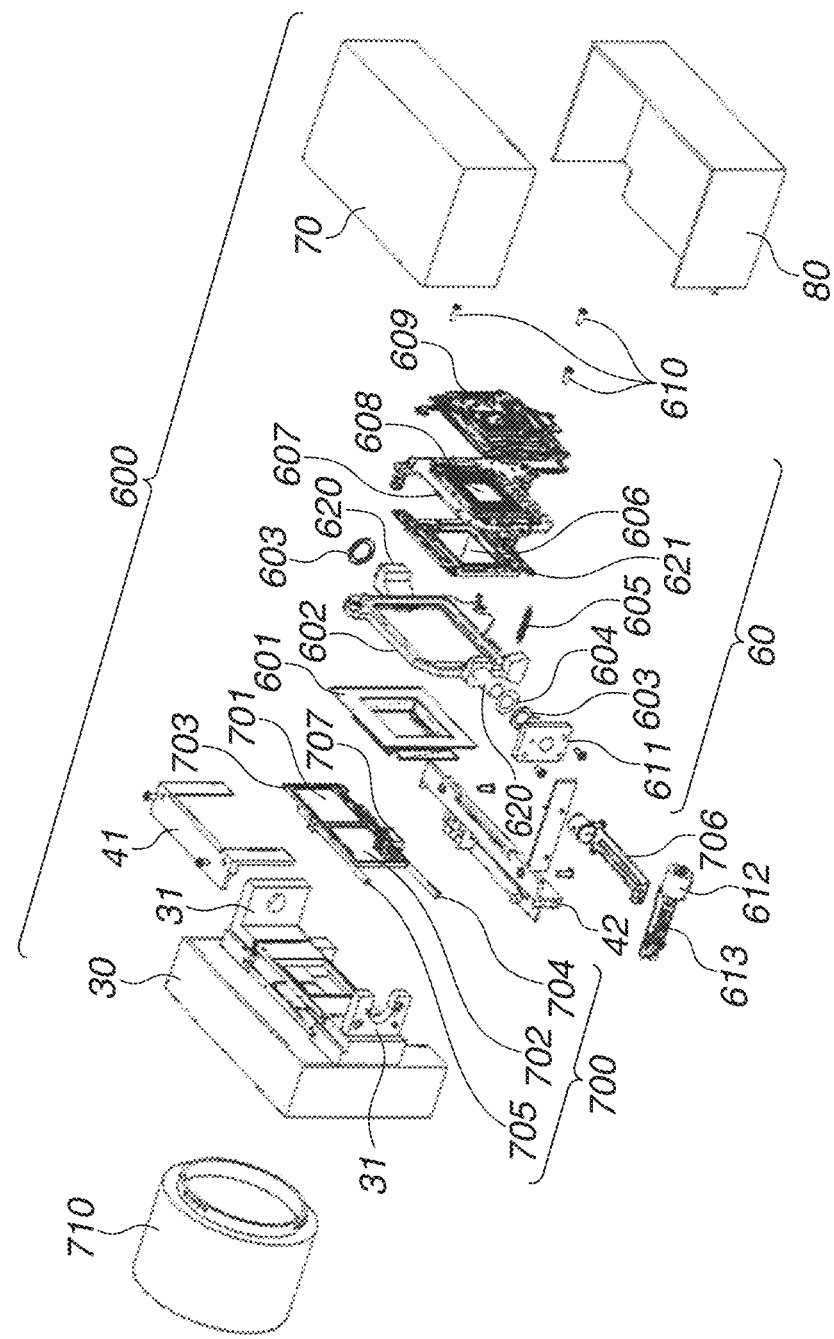
FIG. 7 is an exploded perspective view illustrating an imaging apparatus according to the third exemplary embodiment.

An imaging apparatus according to a third exemplary embodiment is described below with reference to FIG. 6 and FIG. 7. FIG. 6 is an exploded perspective view illustrating a network monitoring camera (hereinafter, referred to as monitoring camera) according to the third exemplary embodiment. FIG. 7 is an exploded perspective view illustrating an imaging apparatus according to the third exemplary embodiment. In the first exemplary embodiment and the second exemplary embodiment, the dome network camera has been described. In exemplary embodiments in and after the third exemplary embodiment, a network camera in which a lens barrel is detachable from the imaging apparatus is described.

As illustrated in FIG. 6, the monitoring camera includes a camera body 600 as an example of the imaging apparatus, and a lens barrel 710 attached to the camera body 600. The lens barrel 710 is detachable from the camera body 600.

The camera body 600 includes a tilt base 30, an optical filter driving unit 700, an image capturing element unit 60, an upper case 70, and a bottom case 80.

The tilt base 30 serving as a base member includes a mount unit 32 to which the lens barrel 710 may be attached. The mount unit 32 includes three pawls, and the three pawls of the mount unit 32 engage with pawls of the lens barrel 710 to fix the lens barrel 710 to the camera body 600. Further, the image capturing element unit 60 is fixed to the tilt base 30.

The optical filter driving unit 700 inserts an infrared cut-off filter 701 or a dummy glass 702 into an optical path, or retreats the infrared cut-off filter 701 or the dummy glass 702 from the optical path. The optical filter driving unit 700 inserts the infrared cut-off filter 701 into the optical path in a day mode, and retreats the infrared cut-off filter 701 from the optical path and inserts the dummy glass 702 into the optical path in a night mode. A filter holding frame 703 holds the infrared cut-off filter 701 and the dummy glass 702. The filter holding frame 703 is held by a guide bar 704 fixed to the tilt base 30 so as to be movable in a direction substantially perpendicular to the optical axis. Rotation of the filter holding frame 703 around the guide bar 704 is regulated by engagement of a guide bar 705 with a U-shaped groove on the filter holding frame 703. A rack 707 is fixed to the filter holding frame 703 while being biased in an axis direction perpendicular to the optical axis and in a rotation direction by a rack spring (not illustrated), and engages with a screw part of a stepping motor 706. The rack 707 moves together with the filter holding frame 703 in the direction substantially perpendicular to the optical axis by rotation of the screw part.

The upper case 70 and the bottom case 80 are configured so as to cover the optical filter driving unit 700 and the image capturing element unit 60. Each of the upper case 70 and the bottom case 80 has a rectangular shape, and are fastened to the tilt base 30 to form a housing of the camera body 600.

Figure 8:
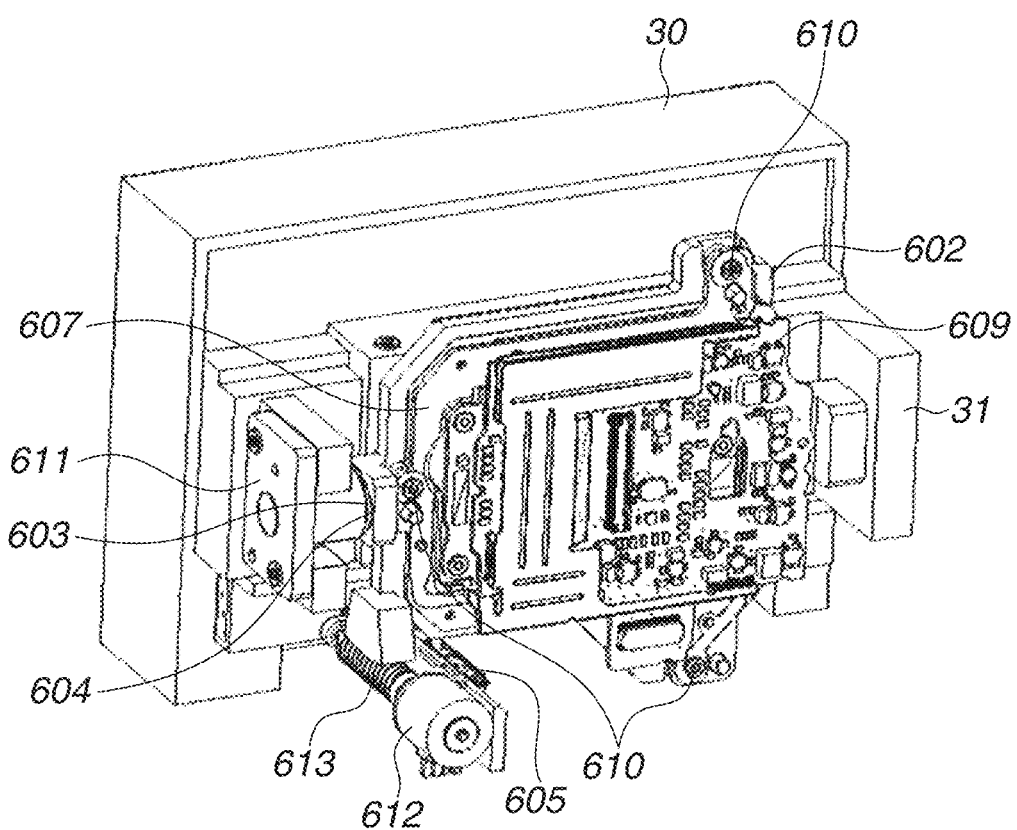
FIG. 8 is a perspective view illustrating the imaging apparatus according to the third exemplary embodiment.
Figure 9A:
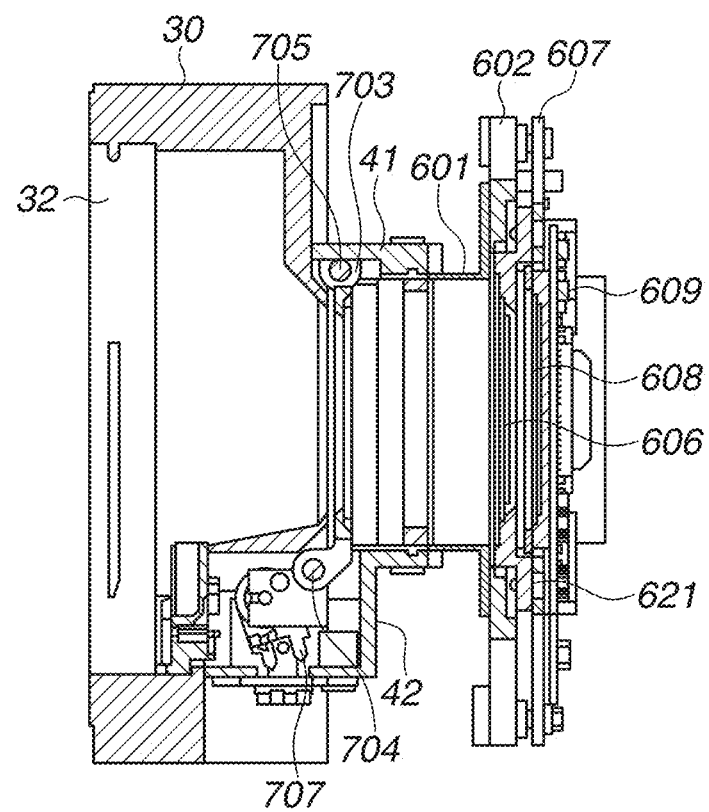
FIG. 9A is a cross-sectional view illustrating the imaging apparatus according to the third exemplary embodiment.
Figure 9B:
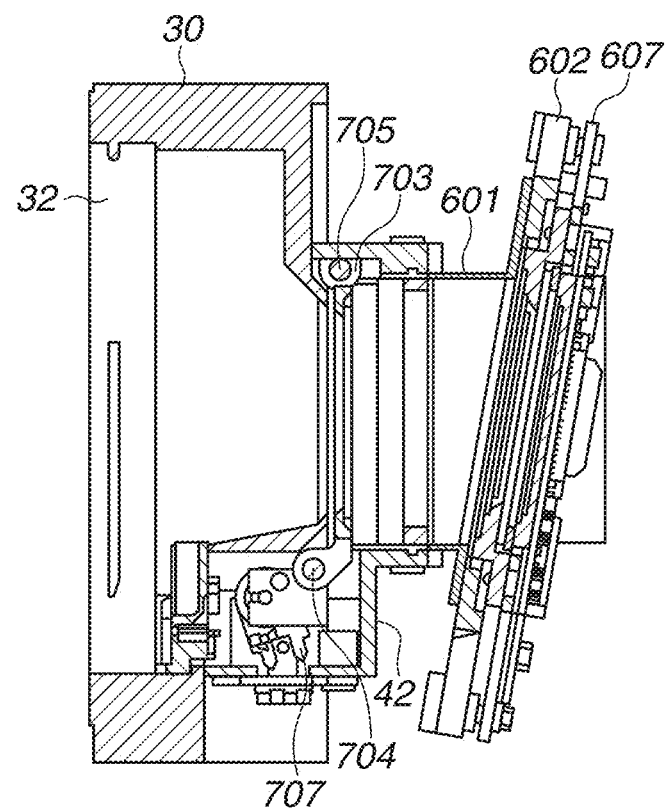
FIG. 9B is a cross-sectional view illustrating the imaging apparatus when an image capturing element is tilted, according to the third exemplary embodiment.

Next, the image capturing element unit 60 is described with reference to FIG. 7 to FIG. 9B. FIG. 8 is a perspective view illustrating the imaging apparatus according to the third exemplary embodiment. FIG. 9A is a cross-sectional view illustrating the imaging apparatus according to the third exemplary embodiment. FIG. 9B is a cross-sectional view illustrating the imaging apparatus when the image capturing element is tilted, according to the third exemplary embodiment.

The image capturing element unit 60 include an image capturing element holder 602 and a sealing member 601.

The image capturing element holder 602 holds the image capturing element 608 so as to be tiltable to a surface orthogonal to the optical axis. The image capturing element 608 converts an image obtained through the imaging lens into an electronic signal. The image capturing element 608 is soldered to a circuit board 609 that electrically connects the image capturing element 608, and is bonded to an image capturing element sheet metal 607 by an adhesive (not illustrated). An image capturing element sheet metal 607 attached with the image capturing element 608 and the circuit board 609 is attached to the image capturing element holder 602 by fastening screws 610. Further, the image capturing element holder 602 is integrally formed with a rotary shaft 620, and the rotary shaft 620 is supported by a supporting part 31 of the tilt base 30. A washer 603 is disposed on the rotary shaft 620. Further, a wave washer 604 is further disposed on one side of the rotary shaft 620, and biases the image capturing element holder 602 toward the rotary shaft 620. Further, an optical low-pass filter holder 621 that holds an optical low-pass filter 606 is inserted into the image capturing element holder 602.

The sealing member 601 seals a gap between the image capturing element holder 602 and the tilt base 30. The sealing member 601 is fixed to the tilt base 30 by fixing members 41 and 42, and is pressurized toward the tilt base 30 by the image capturing element holder 602. The sealing member 601 is formed of an elastic light-shielding material such as rubber, and deforms by tilting of the image capturing element holder 602.

A stepping motor 612 serving as a driving member is fixed to the tilt base 30, and a worm 613 is fixed to a motor shaft by press-fitting, etc. A worm wheel is integrally provided on the image capturing element holder 602, and engages with the worm 613. The stepping motor 612 is connected to an FPC (not illustrated), and drives and rotates the worm 613 by energization, to tilt the image capturing element holder 602 and the image capturing element 608. A tension spring 605 is to remove backlash between the worm 613 and the worm wheel, and is attached to the tilt base 30 and the image capturing element holder 602 to generate biasing force in a tension direction.

An initial tilting reference position of the image capturing element holder 602 is determined in such a manner that a voltage output value of a photo interrupter fixed to the tilt base 30 is detected by a detection member integrally provided on the image capturing element holder 602, and the number of driving pulses of the stepping motor 612 is calculated from a result of the detection.

Next, relationship between tilting of the image capturing element holder 602 and the sealing member 601 is described. As illustrated in FIG. 9A, when the stepping motor 612 is driven in a state where the image capturing element holder 602 is orthogonal to the optical axis, the image capturing element holder 602 is tilted relative to the surface orthogonal to the optical axis as illustrated in FIG. 9B. In the state illustrated in FIG. 9A, the sealing member 601 seals the gap between the image capturing element holder 602 and the tilt base 30. In addition, also in the state illustrated in FIG. 9B, the sealing member 601 deforms to seal the gap between the image capturing element holder 602 and the tilt base 30.

As described above, the sealing member 601 seals the gap between the image capturing element holder 602 and the tilt base 30 irrespective of a tilting angle of the image capturing element holder 602. This makes it possible to prevent foreign matters from entering the camera unit. Further, since the sealing member 601 is formed of a light-shielding material, it is also possible to prevent unnecessary light from entering the image capturing element 608 from the gap between the image capturing element holder 602 and the tilt base 30.

An imaging apparatus according to a fourth exemplary embodiment is described with reference to FIGS. 10A and 10B and FIG. 11.

Figure 10A:
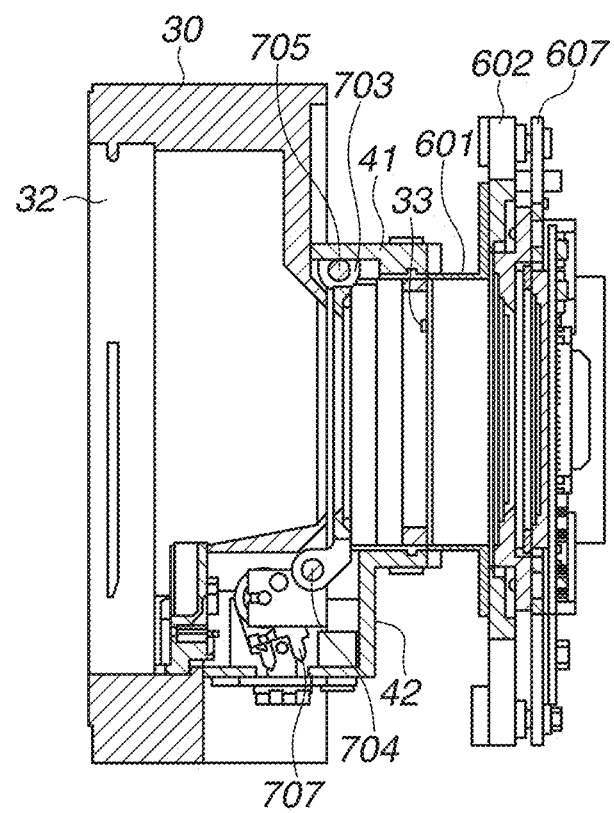
FIG. 10A is a cross-sectional view illustrating an imaging apparatus according to a fourth exemplary embodiment.

FIG. 10A is a cross-sectional view illustrating the imaging apparatus according to the fourth exemplary embodiment. FIG. 10B is a cross-sectional view illustrating the imaging apparatus when an image capturing element is tilted, according to the fourth exemplary embodiment. FIG. 11 is a perspective view in a state where a cover is removed from the imaging apparatus according to the fourth exemplary embodiment. A configuration is similar to the configuration of the third exemplary embodiment except for the tilt base 30, and detailed description of the configuration is therefore omitted.

Figure 11:
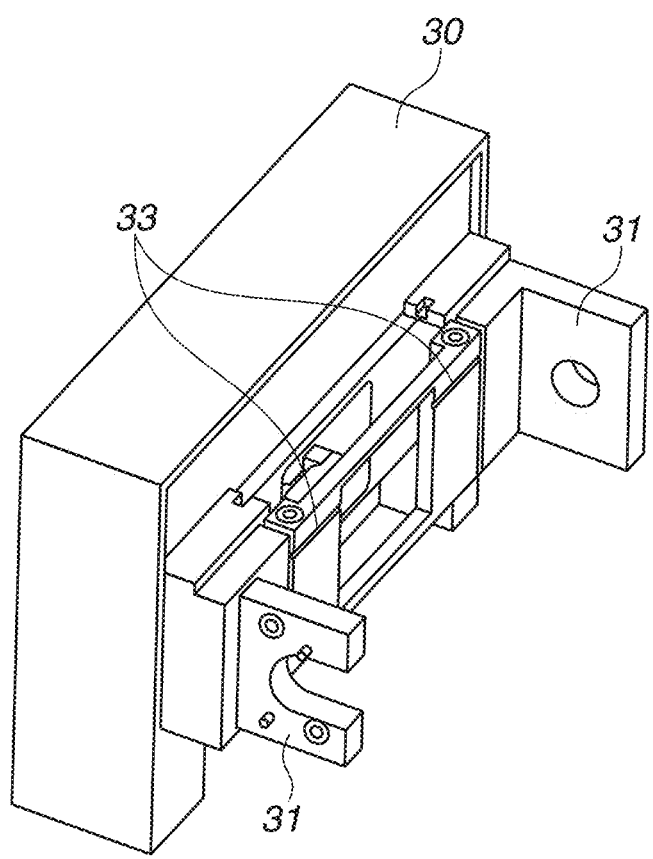
FIG. 11 is a perspective view illustrating a state where a cover is removed from the imaging apparatus according to the fourth exemplary embodiment.

As illustrated in FIG. 11, the tilt base 30 according to the fourth exemplary embodiment includes two vent holes 33 as an example of a communication part. Each of the two vent holes 33 is a linear groove straightly extending in a direction of the rotary shaft 620 of the image capturing element holder 602. The two vent holes 33 are located above the rotary shaft 620 of the image capturing element holder 602. As illustrated in FIG. 11, the vent holes 33 allows inside and outside of the sealing member 601 to communicate with each other.

Figure 10B:
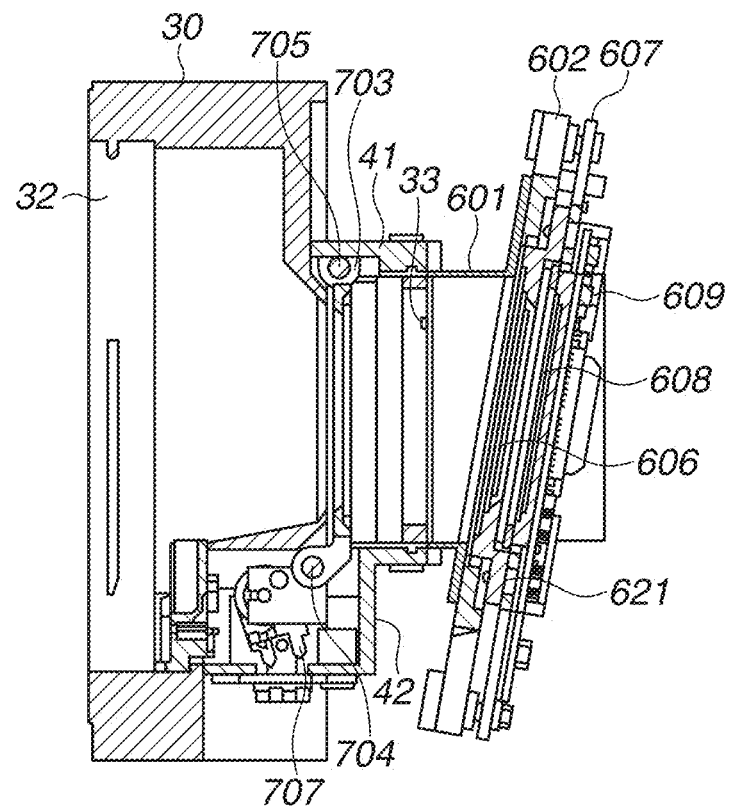
FIG. 10B is a cross-sectional view illustrating the imaging apparatus when an image capturing element is tilted, according to the fourth exemplary embodiment.

When the image capturing element holder 602 is tilted from the state illustrated in FIG. 10A to the state illustrated in FIG. 10B, a volume inside the sealing member 601 is reduced. At this time, air inside the sealing member 601 is discharged to the outside through the vent holes 33. This makes it possible to reduce driving load by volume change of the sealing member 601 associated with tilting of the image capturing element 608.

The vent holes 33 may be provided on the sealing member 601. Further, an air filter or an adhesive may be disposed on each of the vent holes 33. This makes it possible to prevent foreign matters from entering.

Figure 12:
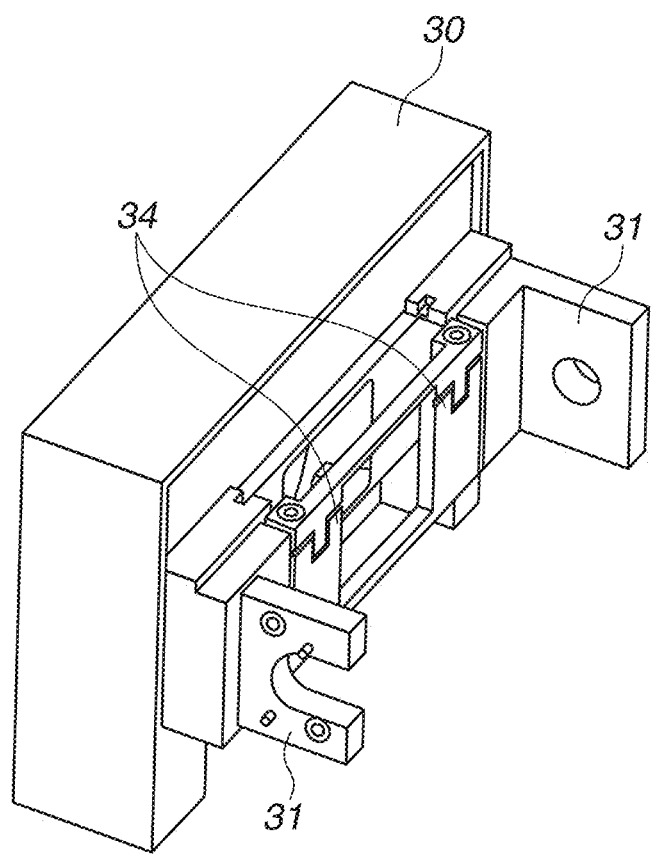
FIG. 12 is a perspective view illustrating a state where a cover is removed from an imaging apparatus according to a fifth exemplary embodiment.

An imaging apparatus according to a fifth exemplary embodiment is described below with reference to FIG. 12. FIG. 12 is a perspective view in a state where a cover is removed from the imaging apparatus according to the fifth exemplary embodiment. A configuration is similar to the configuration of the fourth exemplary embodiment except for the tilt base 30, and detailed description of the configuration is therefore omitted.

As illustrated in FIG. 12, the tilt base 30 according to the fifth exemplary embodiment includes two vent holes 34 as an example of the communication part. Each of the two vent holes 34 includes a bent portion in a bent shape. Further, the two vent holes 34 are located above the rotary shaft 620 of the image capturing element holder 602.

When the image capturing element holder 602 is tilted, a volume inside the sealing member 601 is reduced. At this time, air inside the sealing member 601 is discharged to the outside through the vent holes 34. This makes it possible to reduce driving load by volume change of the sealing member 601 associated with tilting of the image capturing element 608. Further, since each of the vent holes 34 includes the bent shape, it is possible to prevent foreign matters from entering in comparison with a case where the vent holes 34 straightly extend.

An imaging apparatus according to a sixth exemplary embodiment is described below with reference to FIGS. 13A and 13B.

Figure 13A:
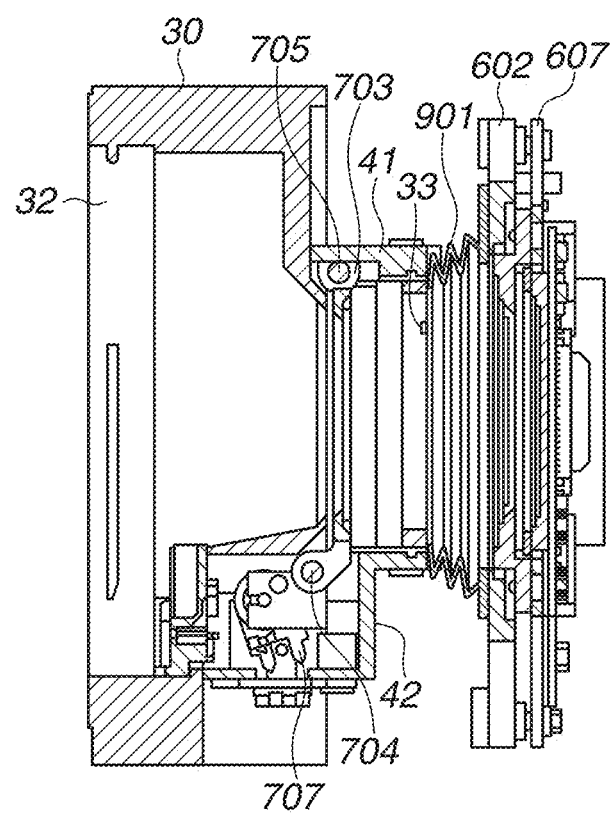
FIG. 13A is a cross-sectional view illustrating an imaging apparatus according to a sixth exemplary embodiment.
Figure 13B:
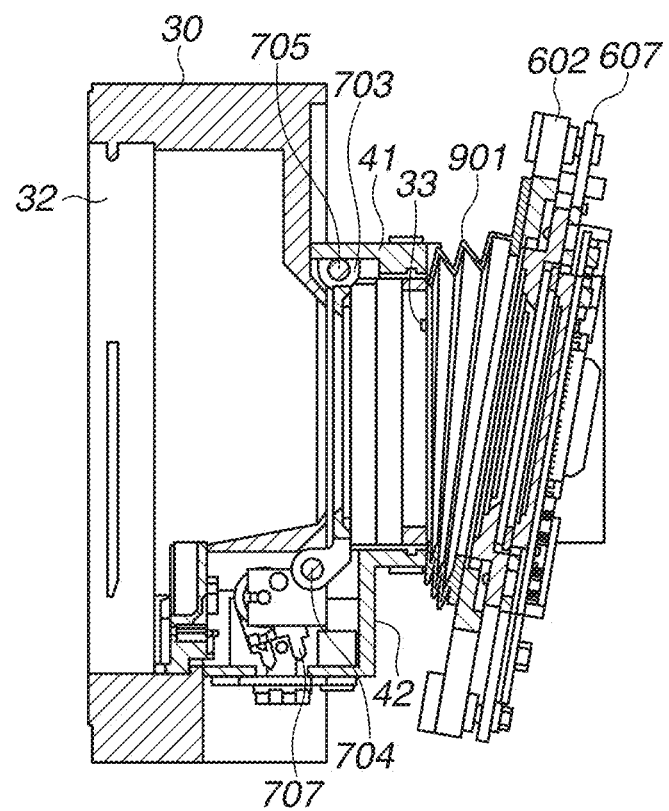
FIG. 13B is a cross-sectional view illustrating the imaging apparatus when an image capturing element is tilted, according to the sixth exemplary embodiment.

FIG. 13A is a cross-sectional view illustrating the imaging apparatus according to the sixth exemplary embodiment. FIG. 13B is a cross-sectional view of the imaging apparatus when an image capturing element is tilted, according to the sixth exemplary embodiment. A configuration is similar to the configuration of the third exemplary embodiment except for a sealing member, and detailed description of the configuration is therefore omitted.

A sealing member 901 seals the gap between the image capturing element holder 602 and the tilt base 30. The sealing member 901 is fixed to the tilt base 30 by the fixing members 41 and 42, and is pressurized toward the tilt base 30 by the image capturing element holder 602. The sealing member 901 is formed of an elastic light-shielding material such as rubber, and has a bellows shape. The sealing member 901 deforms by tilting of the image capturing element holder 602. Further, a height of the sealing member 901 on the tilt base 30 side is lower than the height on the image capturing element holder 602 side.

As described above, since the sealing member 901 has a bellows shape in the sixth exemplary embodiment, it is possible to reduce driving load associated with the deformation of the sealing member 901 when the image capturing element holder 602 is tilted. Further, the sealing member 901 seals the gap between the image capturing element holder 602 and the tilt base 30 irrespective of the tilting angle of the image capturing element holder 602. Accordingly, it is possible to prevent foreign matters from entering the lens barrel and the imaging apparatus. Further, since the sealing member 901 is formed of a light-shielding material, it is also possible to reduce unnecessary light from entering the image capturing element 608 from the gap between the image capturing element holder 602 and the tilt base 30.

Further, since the height of the sealing member 901 on the tilt base 30 side is lower than the height on the image capturing element holder 602 side, it is possible to further reduce the driving load associated with the deformation of the sealing member 901 when the image capturing element holder 602 is tilted.

The configuration of the present invention is not limited to the configurations exemplified in the respective exemplary embodiments, and materials, shapes, dimensions, forms, numbers, installation positions, etc. may be appropriately modified without departing from the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An imaging apparatus, comprising:
   an image capturing element;
   a holder configured to hold the image capturing element, wherein the holder has a tilt shaft, and wherein a worm wheel is formed in the holder;
   a base member configured to tiltably support the holder around the tilt shaft, wherein, in an optical axis direction of an imaging lens, the base member, the holder, and the image capturing element are arranged in this order;

a driving member configured to tilt the holder around the tilt shaft to tilt the image capturing element relative to a surface orthogonal to the optical axis of the imaging lens and having a worm engaged with the worm wheel;

a first member sealing a first gap between the base member and the holder and configured not to deform if the driving member does not tilt the holder relative to the surface orthogonal to the optical axis of the imaging lens and configured to deform if the driving member tilts the holder relative to the surface orthogonal to the optical axis of the imaging lens; and a second member sealing a second gap between the image capturing element and the holder.

2. The imaging apparatus according to claim 1, wherein the first member is fixed to at least one of the base member and the holder.

3. The imaging apparatus according to claim 1, wherein the first member has a bellows shape.

4. The imaging apparatus according to claim 1, wherein the first member is formed of an elastic material.

5. The imaging apparatus according to claim 1, wherein the first member is formed of a light-shielding material.

6. The imaging apparatus according to claim 1, wherein the second member is configured to surround a periphery of a light receiving surface of the image capturing element.

* * * * *